United States Patent [19]

Morrison

[11] 3,818,108

[45] June 18, 1974

[54] ZERO FERMENTATION BREAD PROCESS

[75] Inventor: Bradley W. Morrison, Chateauguay, Quebec, Canada

[73] Assignee: The Ogilvie Flour Mills Company Limited, Montreal, Quebec, Canada

[22] Filed: Oct. 19, 1972

[21] Appl. No.: 299,124

Related U.S. Application Data

[63] Continuation-in-part of Ser. No. 171,402, Aug. 12, 1971 abandoned, which is a continuation of Ser. No. 767,921, Oct. 6, 1968, abandoned.

[52] U.S. Cl. .................................. 426/25, 426/208
[51] Int. Cl. .......................... A21d 2/22, A21d 2/04
[58] Field of Search ....... 99/90 CB, 91; 426/25, 208

[56] References Cited
UNITED STATES PATENTS 3,304,183  2/1967  Johnston et al. ................. 99/90 CB
3,594,180  7/1971  Hulse et al. ......................... 99/91 X

OTHER PUBLICATIONS

Marston, "Fresh Look at No-Time Doughs for Bread Production with Normal Bakery Equipment," Cereal Science Today, Vol. 11, pages 530–532, 542 (Dec. 1966), TP1C34.

*Primary Examiner*—Raymond N. Jones
*Assistant Examiner*—James Robert Hoffman
*Attorney, Agent, or Firm*—Cushman, Darby & Cushman

[57] ABSTRACT

An activated flour containing defined amounts of ascorbic acid and an edible oxidising agent when used in the manufacture of yeast-raised baked goods permits the elimination of the distinct bulk fermentation period and thereby significantly reducing the overall processing time, typically to around two hours or less. The flour is used in a process of improving the straight-dough method of preparing yeast-raised baked goods in which the activated flour is mixed with conventional dough ingredients, the dough is relaxed and immediately thereafter divided, moulded, panned, proofed and baked.

3 Claims, No Drawings

ZERO FERMENTATION BREAD PROCESS

This application is a continuation-in-part of my application Ser. No. 171,402, filed Aug. 12, 1971, which in turn is a continuation of my application Ser. no. 767,921 filed Oct. 4, 1968, both now abandoned.

This invention relates to an improved process for preparing bread, rolls, buns and like yeast-leavened bakery products.

At present, there are three generally accepted methods for preparation of a bread dough suitable for dividing and subsequent processing, namely:

i. the straight-dough procedure;
ii. the sponge-dough procedure; and
iii. the continuous or mechanically developed procedure.

In the art, the straight-dough and sponge-dough procedures are often designated as "conventional" processes by way of distinguishing them from the more recent continuous processes, and the term "conventional" as applied to the processes is to be construed in this sense in this specification.

In the straight-dough method, all of the ingredients are mixed together as a single batch. Mixing is continued until the dough assumes a smooth appearance and acquires an elastic character. The dough is then subjected to prolonged fermentation at increased yeast levels for a period of time of between about 2 and 4 hours, prior to subjecting the fermented dough to the conventional processing steps of dividing, moulding, panning, proofing and baking. This method, therefore, is associated with long process times, much handling and extensive areas for storage during the fermentation.

The sponge-dough method is also a very time consuming one which requires a preliminary "sponge" preparation, the sponge including about 60 percent of the flour, the yeast, yeast nutrients and enough water to make a dough. The sponge is then subjected to a prolonged fermentation of 4 to 6 or more hours, in order to render it capable of producing satisfactory bread. Following this prolonged fermentation, which requires considerable handling of the dough and necessitates large floor areas to accommodate the troughs of dough required for the fermentation, the sponge is combined with the remainder of the flour and water as well as with the other dough ingredients to produce the finished dough which is then allowed to relax in dough troughs on the floor for some 20 to 40 minutes (referred to as the "floor time") before being subjected to the other conventional baking steps.

Both the straight dough and the sponge dough procedures, therefore, rely upon a prolonged preliminary or bulk fermentation period not only for gas formation but to develop certain characteristics in the dough, such as good mixing properties and optimum extensibility, that are essential for further effective processing and for the production of bread of the desired high quality standards. This bulk fermentation period not only prolongs the overall processing time, but is also inconvenient, reduces flexibility and requires extensive dough trough capacity.

In recent years, continuous or mechanical development methods of bread preparation have been introduced. These methods in the main depend upon the utilization of special mixing or dough development equipment, liquid brew systems, and often high levels of oxidant to bring about the desirable physical changes (development) of the dough usually accomplished by fermentation. The continuous dough procedures have substantially eliminated prolonged fermentation of dough, but require costly investment in specialised machinery to achieve this end.

A primary object of this invention is to provide an improved conventional, i.e., non-continuous, bread-making process in which optimum dough and bread characteristics are developed in a novel manner using standard bakery equipment.

A further and more specific object of this invention is to provide a novel, conventional bread-making process in which the bulk fermentation period is eliminated or greatly reduced without substantially detracting from the quality of the finished product.

This invention is based on our discovery, subsequently verified by substantial development work, that mixtures of two commonly used flour improvers, namely an ascorbate compound such as ascorbic acid and an oxidant such as an alkali or alkaline earth metal bromate will, in appropriate amounts, accelerate dough development to the extent that the bulk fermentation period associated with conventional bread processes can be eliminated or greatly reduced.

The amounts of each improver that must be employed in combined use in order to obtain the desired results have been found to be within the following ranges:

Ascorbates such as ascorbic acid: from about 20 to about 150 p.p.m. (based on flour weight); flour oxidant such as potassium bromate: from about 15 to about 50 p.p.m. (based on flour weight). Optimum levels for each of the improvers will be apparent from the data presented in the examples given herein.

Accordingly, in one of its aspects, this invention provides an improved conventional process for making bread and like yeast-leavened products which comprises mixing standard dough ingredients mainly including flour, water and yeast. with from 20 to 150 p.p.m. based on the flour weight of an ascorbate compound and from 15 to 50 p.p.m. of at least one edible oxidising agent to form a dough, relaxing the dough for a period of up to about 30 minutes, and thereafter dividing, moulding, panning, proofing and baking the dough.

The preferred ascorbate compound is L-ascorbic acid and the preferred edible flour oxidant is a bromate, conveniently potassium bromate, and, for convenience, the following discussion will refer mainly to combinations of these two compounds, though other ascorbates and other edible oxidising agents such, for example, as sodium bromate, calcium bromate, sodium iodate, potassium iodate, calcium iodate, potassium persulfate and chlorine dioxide may be employed.

The chemistry involved in the combined action of ascorbic acid and the bromate compound is not known. Both ascorbic acid and potassium bromate individually have been used for years in conventional bread processes and both are used as oxidants.

Ascorbic acid is a very mild reducing agent though it is generally agreed today that its improving effect is oxidative in character through dehydroascorbic acid which is produced in doughs from ascorbic acid through an enzyme, L-ascorbic acid oxidase. Dehydroascorbic acid is a mild oxidant and it is therefore believed that dehydroascorbic acid is the active form of L-ascorbic acid so far as dough improvement is concerned.

Ascorbic acid is a slow acting improver and when it is used in dough its action does not become evident until after several hours of fermentation, and that action, as shown by dough rheology experiments, is that of an oxidizing agent. This is to say ascorbic acid improves the elastic character of dough and therefore its gas retention capacity. When used as a flour improver, its optimum level usually varies from 75 to 150 p.p.m. depending on flour strength. It is currently used in many countries in bread processes involving from 2 to 6 hours of fermentation.

Potassium bromate is also a slow acting flour improver. Its usage is very common in North America at levels of 10 to 20 p.p.m. in conventional dough processes, the amount used varying with flour strength.

Concerning the mechanism of flour improvement by oxidizing agents, much research has been devoted to the subject and various mechanisms have been proposed, some dealing with the oxidation of sulfhydryl groups, others dealing more specifically with liquid-protein interactions in doughs, but none of the proposed theories provides an entirely satisfactory explanation of the phenomenon.

An explanation of the pronounced acceleration in dough development obtained with conventional mixing equipment by combining two slow acting flour improvers involves speculation as to possible synergism between the two improvers, and though it was entirely unexpected, applicants observed a beneficial effect in the use of ascorbic acid and bromate compounds with all types of bakery flours and with many different formula for making yeast-leavened products. Certainly, experiments have established that it is only when the ascorbic acid is used in combination with known edible oxidizing agents such as potassium bromate and potassium iodate that the desired effect in accelerating dough development, so eliminating or reducing the bulk fermentation period in conventional bread processes, can be attained while producing bread of acceptable quality.

The addition of the ascorbic acid and oxidizing agents may be made to the flour at the flour mill, or incorporated into the dough in the bread making process.

The standard dough ingredients referred to herein include the usual ingredients from which a yeast-leavened, typically, a bread, dough is derived, such as cereal flour, water, yeast, yeast nutrients, salt, sugar, milk solids, shortening and softeners.

The process of the invention is applicable to a variety of yeast-leavened dough mixes.

The benefits that may be derived from this invention will be readily recognized by those knowledgeable in the art. With respect to the sponge-dough method, the process of this invention eliminates completely the remixing step, the need to form a sponge, as well as the prolonged fermention of the sponge, thereby eliminating in turn the requirement for troughs and for floor space for fermentation. At the same time the new process produced baked goods indistinguishable in quality from those obtained by the sponge-dough process.

With respect to the straight-dough process, the process of the invention decreases or eliminates the need for fermentation troughs since the time involved in the fermentation step is reduced considerably. Bread obtained by the new process is superior in quality to that obtained by the conventional straight dough process and exhibits a more acceptable inner structure, a thinner crust and improved aroma and flavor.

The process of this invention is of particular advantage in being operable with any formula in which cereal flour is an ingredient in producing yeast-leavened bakery products.

By comparison with processes involving long fermentation periods, the process according to the invention results in greater yields from a given weight of dough-forming ingredients due to the fact that with the new process there is no fermentation loss. The new process also increases the yield of bread by virture of increased water absorption and retention over that in conventional procedures.

Another advantage of this process is an improved softness and an increased shelf life of the product by virtue of the improved capacity for water absorption and retention in the novel doughs by comparison with those of conventional processes.

Improved machinability of the dough is a very favorable advantage of the new process and is the direct result of the markedly reduced fermentation time. It is widely recognized that the prolonged fermentation periods dough stickiness may become a serious problem whereas with the new process doughs are produced that are not sticky and that may be handled with facility.

Another advantage of this new process for bread and rolls is the added flexiblity given to the baker. Bakeries that use either the sponge-method or the straight-dough method are at a great disadvantage when it comes to meeting demands for additional bread on short notice. In the event of a rush order for bread such a bakery is faced with the fact that it cannot produce without going through the lengthy procedure of making the dough. Applicants' process requires a maximum of about 2 ½ hours to prepare the finished product from the time that the ingredients are mixed initially, whereas the straight-dough method requires about twice that length of time and the sponge method approximately 9 hours, including the time expended in preparing the sponge. As the new process is so much less time-consuming it is possible to start production at relatively late periods of the day in order to meet special requirements.

The process according to the invention, due to the virtual elimination of the fermentation step, has the advantage of saving labor costs through reduced handling, and of reducing the need for investment in large floor areas and equipment.

In the preferred embodiment, the process of this invention is carried out in the following way. All the ingredients including flour, yeast, yeast nutrients, salt, sugar and shortening, the flour having been treated with L-ascorbic acid and potassium bromate, are mixed together in a conventional mixer for a period of time equal to that used in a regular straight or sponge dough operation. Following mixing the dough is relaxed and allowed to stand for a period of up to about 30 minutes, often less than about 15. This important step allows the dough to achieve optimal machining characteristics as well as allow the yeast sufficient time to reach a high rate of gas production.

In contrast to the straight dough process where the dough would be set aside to ferment for 2 to 4 hours after the mixing stage, according to the process of this invention the dough is taken directly through the remaining conventional steps of bread manufacture, namely dough dividing, rounding, intermediate proofing, molding and panning, final proofing and baking.

With the doughs of this invention the benfits of increased water absorption and retention and the elimination of the bulk fermentation step and thereby of fermentation loss, which includes lost water, alcohol and carbon dioxide, make it possible for a baker to realise as many as four extra dough pieces per bag of flour, that is, a 3 to 4 percent yield increase. Such a factor is of great significance in a profitable bakery operation. Water absorbance in the range 60 to 70 percent based on flour weight gives the best results as far as yield. With lower water absorbance the resultant yield is reduced while producing a bread of higher density. In addition, because of the reduced fermentation time, less sugar is fermented by the yeast and accordingly the amount of sugar that normally goes into a conventional bread formula may be scaled down thereby resulting in further savings to the baker.

Bread obtained by the new process has a softer and more uniform texture, a thinner crust and a much improved flavor.

The following Examples are given by way of facilitating a more comprehensive understanding of this invention.

EXAMPLE 1

PART A

| Formula | Content (gms) | Wt.% based on flour |
|---|---|---|
| Flour, bromated, bleached, enriched | 400 | 100 |
| Sugar | 20 | 5 |
| Salt | 8 | 2 |
| Milk | 8 | 2 |
| Yeast | 12 | 3 |
| Lard | 12 | 3 |
| Water | 260 | 65 |

Bromate in flour: 8 p.p.m.
Flour grade equal to Bakers Patent — .46% Ash, 13% Protein, 64% Farinograph Absorption.

Procedure

1. The doughs were mixed for one-half minute on 1st speed and 2 ½ minutes on 2nd speed, using a Hobart C-100 mixer equipped with a McDuffy bowl. Dough temperature out of the mixer was 85°F.
2. Floor time given was 20 minutes.
3. The doughs were then made up on a National Sheeter and Moulder and panned. Dough quality characteristics were noted.
4. The loaves were proofed for 80 minutes at 100°F and 50 percent Relative humidity.
5. The proofed loaves were baked for 30 minutes at 425°F in an electric hearth oven.
6. The baked loaves were measured for volume by rapeseed displacement.
7. The loaves were scored for both external and internal quality characteristics the following day.

Results

Bread made from the formula given in this Example using the above procedure exhibited very immature structural and textural characteristics, and had a volume of 2500 c.c. and specific volume of 5.2 c.c./gm.

PART B

The procedure of Part A was repeated exactly using the same formula except that the flour was bromated to a total bromate level of 25 p.p.m. The resultant bread was still immature, exhibited a round, open cell structure and had a volume of 2,650 c.c. with specific volume of 5.6 c.c./gm.

PART C

The procedure of Part A was repeated exactly using the same formula except that a standard flour (non-bromated) was treated with 50 p.p.m. of L-ascorbic acid. While the loaf volume improved to 2,850 c.c. and specific volume to 5.8 c.c./gm. the doughs were tight in the moulding stage and the internal crumb was immature.

PART D

The procedure of Part A was repeated exactly using the same formula except that a standard flour was bromated to a total bromate level of 25 p.p.m. and 50 p.p.m. of ascorbic acid was also incorporated. Dough handling properties were excellent and quite similar to those of a re-mixed sponge and dough. Loaf volume improved to 3,150 c.c. and specific volume to 6.4 c.c./gm. These values and the general loaf characteristics, both internal and external, were fully comparable to those of bread made by a regular sponge-dough method.

This Example demonstrates that it is only by combining together ascorbic acid and a bromate compound that the desired effect in accelerating dough development is obtained while still maintaining high quality and good characteristics in the baked loaf.

EXAMPLE 2

Hamburger Buns

| Formula | Content (gms) | Wt.% based on flour |
|---|---|---|
| Flour* | 400 | 100 |
| Sugar | 36 | 9 |
| Salt | 8 | 2 |
| Milk | 24 | 6 |
| Yeast | 12 | 3 |
| Shortening | 40 | 10 |
| Yeast Food | 1 | .25 |
| Water | 264 | 66 |

*Flour grade equal to Bakers Patent — .46% Ash, 13% Protein, 64% Farinograph absorption.
Treated with 25 p.p.m. bromate, 50 p.p.m. ascorbic acid.
Total bromate 32 p.p.m. including yeast food.

Procedure

1. The dough was mixed for one-half minute on 1st speed, and 3 ½ minutes on 2nd speed, using a Hobart C-100 mixer equipped with a McDuffy bowl. The temperature of the dough out of the mixer was 80°F.
2. The dough was given 15 minutes floor time.
3. The dough was divided by hand into 2 ounce pieces, moulded by hand, flattened, and placed on a well-greased sheet.
4. The dough pieces were proofed for 1 hour and 20 minutes at 100°F and 50 percent Relative humidity.
5. The proofed buns were baked for 15 minutes at 425°F in an electric hearth oven.
6. The baked buns were measured for volume by rapeseed displacement.
7. The buns were examined for both external and internal quality characteristics.

Results

Buns made from the formula given and using the above procedure exhibited characteristics equivalent to hamburger buns made by a regular sponge and dough procedure.

EXAMPLE 3

100 percent Whole Wheat Bread
PART A

| Formula | Content (gms) | Wt.% based on flour |
|---|---|---|
| Whole Wheat Flour* | 400 | 100 |
| Sugar | 20 | 5 |
| Salt | 8 | 2 |
| Milk | 8 | 2 |
| Yeast | 12 | 3 |
| Lard | 12 | 3 |
| Water | 280 | 70 |

*Bromate in Whole Wheat Flour: 20 p.p.m.

Procedure

1. The doughs were mixed for one-half minute on 1st speed and 2 ½ minutes on 2nd speed, using a Hobart C-100 mixer equipped with a McDuffy bowl. Dough temperature out of the mixer was 85°F.
2. Floor time given was 20 minutes.
3. The doughs were then made up on the National Sheeter and Moulder and panned. Dough quality characteristics were noted.
4. The loaves were proofed for 80 minutes at 100°F. and 50 percent relative humidity.
6. The baked loaves were measured for volume by rapeseed displacement.
7. The loaves were scored for both external and internal quality characteristics the following day.

Results

Whole wheat bread made according to this Example was immature and had a dense texture. Loaf volume was 2,600 c.c., and specific volume was 5.4 c.c./gm.

PART B

The procedure of Part A was repeated exactly using the same formula except that 25 p.p.m. ascorbic acid was added to the whole wheat flour in addition to the 20 p.p.m. bromate. The resultant dough had good handling characteristics. The loaf was mature and possessed a good volume, texture, and grain. Loaf volume was 3,000 c.c., and specific volume was 6.2 c.c./gm.

PART C

The procedure of Part A was repeated exactly using the same formula except that 50 p.p.m. ascorbic was added to the whole wheat flour, in addition to the 20 p.p.m. bromate. The resultant dough had good handling characteristics. The loaf was mature and possessed a good volume, texture, and grain. Loaf volume was 3,100 c.c., and specific volume was 6.4 c.c./gm.

PART D

The procedure of Part A was repeated exactly using the same formula except that 100 p.p.m. ascorbic acid was added to the whole wheat flour in addition to the 20 p.p.m. bromate. The resultant dough had good handling characteristics. The loaf was mature and possessed a good volume. Loaf volume was 3,200 c.c., and specific volume was 6.6 c.c./gm.

PART E

The procedure of Part A was repeated exactly using the same formula except that 100 p.p.m. ascorbic acid was added to the whole wheat flour and the bromate level was increased to 35 p.p.m. The resultant dough had good handling characteristics. The loaf was mature and possessed a good volume, but had a slightly open cell structure. Loaf volume was 3250 c.c., and specific volume was 6.7 c.c./gm.

EXAMPLE 4

Commerical Baking Test

| Dough Formula (lean) | Content (pounds) | Wt.% based on flour |
|---|---|---|
| Flour* | 600 | 100 |
| Sugar (liquid) | 30 | 5 |
| Salt | 12 | 2 |
| Milk (skim solids) | 12 | 2 |
| Yeast | 18 | 3 |
| Lard | 15 | 2.5 |
| Water | 420 | 70 |

*Flour grade equal to Bakers Patent — .46% Ash, 13% Protein.
Flour treatment included 25 p.p.m. bromate and 50 p.p.m. ascorbic acid.

Procedure

1. The dough was mixed 1 minute slow speed and 14 minutes high speed in a commercial horizontal three arm mixer. Dough temperature out of the mixer was 85°F.
2. The mixed dough was given a floor time of 15 minutes.
3. The dough was then processed through conventional dividing, rounding, 6 minute overhead proof, and a conventional moulder equipped with a curling action.
4. The moulded loaves were proofed for 65 minutes at 108°F.
5. The proofed loaves were baked for 28 minutes in a conventional traveller oven.
6. The bread was cooled for 1 hour, sliced, and wrapped as usual.
7. Samples of the bread were scored the following day.

Results

All processing factors were comparable to conventional sponge-dough method except for the reduction in the preliminary fermentation period. The dough was made without addition of usual yeast foods, dough conditioners, proteolytic enzymes or bread softeners. The final bread was fully consistent in quality with regular sponge-dough formula (5 hours). Loaf volumes average 100 c.c. larger than those from the sponge-dough method and loaf weights were above the minumum 24 ounce requirement, despite the reduction of dough scaling weights by one-half ounce at the divider (27 ounces as against 27 ½ ounces for conventional sponge-dough). The bread had a desirable golden brown crust, strong side walls, and excellent slicing quality. Internal qualities were equivalent to the normal sponge-dough bread. Bread aroma, flavor, and toasting quality was superior to those for conventional breads.

EXAMPLE 5

Commercial Baking Test

| Dough Formula (rich) | Content (pounds) | Wt.% based on flour |
|---|---|---|
| Flour* | 600 | 100 |
| Sugar | 30 | 5 |
| Salt | 12 | 2 |
| Milk (skim solids) | 18 | 3 |
| Yeast | 18 | 3 |
| Lard | 30 | 5 |

-Continued

| Dough Formula (rich) | Content (pounds) | Wt.% based on flour |
|---|---|---|
| Yeast Food Arkady Type) | 1.5 | 0.25 |
| Mould Inhibitor | 1.5 | 0.25 |
| Softener (Hard Monoglyceride) | 1.9 | 0.31 |
| Water | 402 | 67 |

*Flour grade equal to Bakers Patent — .46% Ash, 13% Protein.
Flour treatments included 37 p.p.m. bromate (including 7 p.p.m. from the yeast food) and 60 p.p.m. ascorbic acid.

Procedure

1. The dough was mixed 1 minute slow speed and 10 minutes high speed in a commercial horizontal three arm mixer. The dough temperature out of the mixer was 92°F (no refrigeration in use).

2. The mixed dough was given a floor time of 10 minutes.

3. The dough was then processed through conventional dividing, rounding, 10 minute overhead proof, and moulded on a conventional "cross grain" moulder.

4. The moulded loaves were proofed for 65 minutes at 110°F and with sufficient relative humidity to prevent the dough surface from forming a crust.

5. The proofed loaves were baked for 26 minutes in a commercial 21 tray traveller oven.

6. The bread was cooled for 1 hour, sliced and wrapped as usual.

7. Samples were examined immediately and again after intervals of 1, 3, and 5 days.

Results

Dough development out of the mixer and machining properties were excellent. Divider weights were extremely uniform throughout the whole batch of over 1,100 pounds of dough. The final bread was indistinguishable in quality from the regular sponge-dough production at the bakery in which this test was run.

EXAMPLE 6

Commercial Baking Test

| Dough Formula (reduced batch size) | Content (pounds) | Wt.% based on flour |
|---|---|---|
| Flour* | 300 | 100 |
| Sugar | 10.5 | 3.5 |
| Salt | 6 | 2 |
| Milk (skim solids) | 9 | 3 |
| Yeast | 9 | 3 |
| Lard | 7.5 | 2.5 |
| Yeast Food (Arkady Type) | .75 | 0.25 |
| Mould Inhibitor | 1 | 0.33 |
| Softener (Hydrated Monoglyceride) | 1 | 0.33 |
| Water | 210 | 70 |

*Flour grade equal to Bakers Patent — .46% Ash, 13% Protein.
Flour treatment included 47 p.p.m. bromate (including 7 p.p.m. from the yeast food) and 50 p.p.m. ascorbic acid.

Procedure

1. The dough was mixed 1 minute slow speed and a total of 16 minutes on high speed in a commercial horizontal three arm mixer. The addition of salt was delayed until after 5 minutes high speed mixing had taken place (dough pick-up) in order to assist dough development in this particular mixer. Dough temperature out of the mixer was 86°F.

2. The mixed dough was given a floor time of 10 minutes.

3. The dough was then processed through conventional dividing and rounding, with 12 minute overhead proof, and was moulded on a conventional cross grain moulder.

4. The moulded loaves were proofed for 60 minutes at 112°F.

5. The proofed loaves were baked for 30 minutes in a commercial 21 tray traveller oven.

6. The bread was cooled for one hour, sliced, and wrapped as usual.

Results

All dough processing and machining qualities were excellent. Loaf volumes at the regular proof time of 60 minutes, and 3 percent yeast level, were considerably larger than normal. Inside crumb finish was good although the cell structure showed evidence of excessive proof rate and oven spring. Subsequent doughs were processed in this bakery where yeast level was reduced to 2.5 percent and 2.0 percent and yeast food eliminated. This resulted in standard loaf volume, grain and texture. Bread aroma, flavor, toasting and eating qualities were judged superior to the standard overnight (12 hour) sponge method in use in the bakery in which this test was run.

EXAMPLE 7

Commercial Baking Test — Accelerated Baking Oven

| Dough Formula | Content (pounds) | Wt.% based on flour |
|---|---|---|
| Flour* | 800 | 100 |
| Sugar | 32 | 4 |
| Salt | 16 | 2 |
| Milk (skim solids) | 16 | 2 |
| Yeast | 24 | 3 |
| Lard | 16 | 2 |
| Yeast Food (double strength Arkady Type) | 2 | 0.25 |
| Mould Inhibitor | 1.5 | 0.2 |
| Softener (hard monoglyceride) | 2.5 | 0.31 |
| Water | 544 | 68 |

*Flour grade equal to Bakers Patent — .46% Ash, 13% Protein.
Flour treatment included 44 p.p.m. bromate (including 14 p.p.m. from yeast foods) and 65 p.p.m. ascorbic acid.

Procedure

1. The dough was mixed 1 minute slow speed and 12 minutes high speed in a commercial 8 bag mixer equipped with three mixing arms and a breaker bar. 4 percent of the dough water was delayed until dough pickup in the mixer which required 5 minutes high speed mixing. This was normal shop practice. Dough temperature out of the mixer was 85°F.

2. The mixed dough was given 10 minutes floor time.

3. The dough was then processed through conventional dividing, rounding, 10 minute overhead proof and moulded on a conventional "cross grain" moulder.

4. The moulded and panned loaves were proofed for 60 minutes in an automatic travelling proofer at 109°F.

5. The proofed loaves proceeded automatically to a traveller oven which was equipped with an electronic grid heat accelerator in the front one-third of the oven. Baking time was 20 minutes at reduced oven temperature.

6. The bread was cooled for one hour, sliced and inserted in a poly bag with clip closure in the usual manner.

Results

The floor time period of 10 minutes in the trial dough compared favourably to the usual 30 minutes given in the sponge-dough procedure. Dough absorption was 3 percent higher than the usual obtained on a 6 hour — 65% sponge method. One-half percent sugar was cut from the formula to compensate for the higher residual sugars in the dough made without bulk fermentation, so that normal crust colour and sweetness were maintained. Dough development, machining properties, proof rate, and baking times were normal under these highly automated shop conditions. The final bread was fully up to the standard sponge-dough product in appearance and eating qualities.

EXAMPLE 8

Commercial Baking Test

| Dough Formula | Content (pounds) | Wt.% based on flour |
|---|---|---|
| Flour* | 100 | 100 |
| Sugar | 5 | 5 |
| Salt | 2.5 | 2.5 |
| Milk (skim solids) | 4 | 4 |
| Yeast | 3 | 3 |
| Lard | 5 | 5 |
| Softener (Hard Monoglycerice) | 0.25 | 0.25 |
| Yeast Food (Arkady Type) | 0.25 | 0.25 |
| Mould Inhibitor | 0.25 | 0.25 |
| Water | 65 | 65 |

*Flour grade equal to Bakers Patent — .46% Ash, 13% Protein.
Flour treatment included 37 p.p.m. bromate (including 7 p.p.m. from yeast food) and 65 p.p.m. ascorbic acid.

Procedure

1. The dough was mixed 2 minutes slow speed and 3 minutes high speed in a 120 quart bowl on a vertical mixer using the dough hook. Dough temperature out of the mixer was 82°F.

2. The mixed dough was given 10 minutes floor time.

3. The dough was then processed through conventional dividing, rounding, 10 minute overhead proof, and moulded on a conventional straight moulder and panned.

4. The panned loaves were proofed for 70 minutes at 105°F.

5. The proofed loaves were baked for 28 minutes in a 10 tray reel type oven.

6. The bread was cooled for 70 minutes, sliced, and wrapped as usual.

7. Samples were examined immediately and at daily intervals for 7 days.

Results

The regular shop formula and method were employed, the only change being the adoption of 10 minutes floor time instead of a 2 ½ hour bulk fermentation period between mixing and dividing the doughs. Machining properties and proofing rate was equal to standard practice. Bread quality, in terms of appearance, size, shape, and texture of loaves, was equal to or better than the normal straight dough product of the bakery concerned.

EXAMPLE 9

Commercial Baking Test - Strong Flour

| Dough Formula | Content (pounds) | Wt.% based on flour |
|---|---|---|
| Flour* | 800 | 100 |
| Sugar | 40 | 5 |
| Salt | 18 | 2.25 |
| Milk (skim solids) | 24 | 3 |
| Yeast | 22 | 2.75 |
| Lard | 32 | 4 |
| Softener (Hard Monoglyceride) | 4 | 0.5 |
| Yeast Food Arkady | 4.5 | 0.56 |
| Phosphate (Acid Calcium Phosphate) | 2 | 0.25 |
| Dough Whitener (enzyme) | 8 | 1 |
| Water | 552 | 69 |

*Flour grade equal to Bakers Patent — .46% Ash, 13% Protein.
Flour treatment included 46 p.p.m. bromate (including 16 p.p.m. from yeast food) and 50 p.p.m. ascorbic acid.

Procedure

1. The dough was mixed 1 minute slow speed and 12 minutes high speed in a commercial horizontal mixer equipped with 3 mixing arms and a breaker bar. The addition of salt was delayed until after 5 minutes of high speed mixing was given. Dough temperature out of the mixer was 84°F.

2. The mixed dough was given 10 minutes floor time.

3. The dough was then processed through conventional dividing, rounding, 10 minute overhead proof and moulded on a commercial reverse sheeting moulder and panned.

4. The panned loaves were proofed for 72 minutes at 110°F in an automatically fed travelling proofer.

5. The proofed loaves were baked for 22 minutes in a commercial traveller oven.

6. The bread was cooled for 1 hour, sliced and bagged in a poly bag with a twist closure in the usual manner.

7. Samples were examined immediately and after 1, 3, and 5 days storage.

Results

Dough absorption was 3% higher than that normally encountered in the regular sponge process. The doughs machined very well through divider, rounder, and moulder. Doughs were scaled at normal weights of 27 ¼ ounces for 24 ounce loaves, 17 ¼ ounces for 16 ounce loaves and 17 ½ ounces for 15 ounce loaves of finished bread. Over 100 finished loaves were weighed at the bread wrapper and in all cases increases of up to 1 ounce per loaf were recorded over the normal bread weights obtained by the sponge method. This was due to improved moisture retention during baking, which was a feature routinely noted in laboratory scale baking tests. This factor in commercial bread production would increase yield by approximately 4-24 ounce loaves per 100 pounds of flour or 6-16 ounce loaves per 100 pounds of flour. The finished bread, in addition to being of very desirable shape, volume, and crust colour, had very good inside texture, grain and crumb softness.

EXAMPLE 10

Part A

| Formula | Content (gm.) | Wt. % based on flour |
|---|---|---|
| Flour | 400 | 100 |
| Water | 260 | 65 |
| Yeast | 12 | 3 |

-Continued

| Formula | Content (gm.) | Wt. % based on flour |
|---|---|---|
| Salt | 8 | 2 |
| Milk | 8 | 2 |
| Shortening | 12 | 3 |
| Sugar | 20 | 5 |
| Ascorbic acid | 60 ppm. | |
| Bromate | 30 ppm. | |

Flour used was an untreated first patent flour with 0.38 percent ash and 11.5 to 12.5 percent protein.

Procedure

1. The doughs were mixed for one-half minute on low speed and 2 ½ minutes on medium speed, using a Hobart C-100 mixer equipped with a McDuffy bowl.
2. Two doughs were prepared under identical procedures except that the time apportioned between mixing and dividing (floor time) was varied. One dough was divided immediately after mixing (zero floor time) and the other dough was relaxed for 15 minutes.
3. The doughs were then divided, moulded and panned as in general practice.
4. The resultant loaves were proofed at 115°F. until ready for baking taking about 90 minutes.
5. The proofed loaves were baked 30 min 425°F.
6. The baked loaves were measured for volume rapeseed displacement and weighed, the results being expresses as specific volume.
7. The loaves were scored for both external and internal quality characteristics.

Results

The breads made from the formula given above using the outlined procedure were judged to have good appearance with a slightly open grain and good flavour. The specific volume measured for the bread derived from the process using zero floor time was 4.5$^{cc.}$/gm. and the value measured for bread derived from the process using 15 minutes floor time was 4.7 $^{cc.}$/gm.

PART B

The procedure of Part A was repeated exactly using the same formula except that the water added amounted to 228 gm. or 57 percent based on flour weight. Doughs were again prepared allowing zero or 15 minutes floor time between mixing and dividing.

The resultant bread was judged to have a bad appearance with a compact grain and good flavour. The specific volume of the breads derived from processes having different floor times were measured to be the same at 3.9 $^{cc.}$/gm.

This example demonstrates the necessity of using water levels of about 65 percent rather than lesser amounts in order to obtain an acceptable bread. Also the beneficial effect of including a definite floor time after mixing is evident from the increased specific volume.

EXAMPLE 11

PART A

| Formula | Content (gm.) | Wt.% based on flour |
|---|---|---|
| Flour | 400 | 100 |
| Water | 228 | 57 |
| Yeast | 8 | 2 |
| Fat | 8 | 2 |
| Salt | 8 | 2 |
| Malt Flour | 2 | 0.5 |
| Ascorbic acid | 100 ppm. | |
| Bromate | 30 ppm. | |
| Ammonium chloride | 300 ppm. | |

Flour used was an untreated first patent flour with 0.38 percent ash and 11.5 percent to 12.5 percent protein.

Procedure

1. The doughs were mixed for one-half minute on low speed and 2 ½ minutes on medium speed, using a Hobart C-100 mixer equipped with a McDuffy bowl.
2. Two doughs were prepared under identical procedures excepting that the time apportioned between mixing and dividing (floor time) was varied. One dough was divided immediately after mixing (zero floor time) and the other dough was relaxed for 15 minutes.
3. The doughs were then divided, moulded and panned as in general practice.
4. The resultant loaves were proofed at 115°F. until ready for baking, taking about 135 minutes.
5. The proofed loaves were baked.
6. The baked loaves were measured for volume by rapeseed displacement and weighed, the results being expressed as specific volume.
7. The loaves were scored for both external and internal quality characteristics.

Results

The breads prepared from the above formula and procedure were judged to have good to excellent appearance. The bread derived from doughs given floor time had a specific volume of 4.3$^{cc.}$/gm, a fine grain texture and dilute flavour. Using a floor time of 15 minutes resulted in the specific volume increasing to 4.7$^{cc.}$/gm. and opening the grain slightly.

PART B

The procedure of Part A was repeated exactly using the same formula except that the water added amounted to 260 gm. or 65 percent based on flour weight. Doughs were again prepared with zero and with 15 minutes floor time after mixing.

The resultant bread was judged acceptable to good in appearance with slightly open grain and dilute flavour. With zero flour time, the bread prepared had a measured specific volume of 4.2$^{cc.}$/gm. By introducing a distinct floor time into the overall process, the specific volume increased to 4.4$^{cc.}$/gm.

This example shows the improved yield obtained when a dough is allowed to relax for a definite period after the mixing step.

It will be apparent from the foregoing discussion and examples that applicant has shown conclusively that yeast-raised doughs may be effectively matured and will develop excellent dough characteristics despite the elimination of the bulk fermentation period as such prior to final proofing, and that such doughs may be processed in conventional equipment and baked into products indistinguishable from baked goods made according to regular sponge and straight dough methods.

The advantages of applicants' novel process may be summarised as follows:

It is designed to produce bread and rolls by a chemically activated dough development process; the bulk fermentation phase of either the straight dough or spongedough processes is eliminated; all ingredients of standard baking formulas may be employed, although it is not necessary to use high levels of yeast foods or dough conditioners; yeast levels of 2 ½ – 3 percent having been found satisfactory. Mixing times remain as used for remixing sponge and dough formula as does floor time, if given, and conventional make-up, proofing, and baking are employed; slightly lower sugar levels may be used, with no loss of sweetness or crust colour, due to natural sugars in flour not being consumed in bulk fermentation; water absorption levels in excess of those used in sponge systems are possible without impairing machine-ability; dough dividing is extremely accurate due to the high level of uniformity in the gas cells in the freshly mixed dough; and superior water-retention capacity of the novel doughs enables a reduction in scaling weight to be be effected. Those factors plus the elimination of fermentation loss gives a significant increase of bread yield of 3–4 loaves (24 oz.) per cwt. of flour, and further the dough temperature from the mixer need not be rigidly controlled and it is possible to mix without using refrigeration jacket.

What we claim is:

1. A process for accelerating the maturing of yeast-raised doughs and for improving the machine qualities thereof which comprises forming a dough by combining together wheat flour containing a dough development accelerator consisting essentially of (1) about 20 to about 150 p.p.m. ascorbic acid, based on the flour weight, and (2) about 15 to about 50 p.p.m., based on the flour weight, of an edible oxidizing agent selected from the group consisting of potassium bromate, potassium iodate, potassium persulfate and chlorine dioxide, together with sugar, salt, milk, shortening, yeast and water, mixing the combined ingredients for about 3 to 20 minutes, permitting the dough so obtained to relax for a period of between about 10 to about 20 minutes, and immediately thereafter dividing the dough into dough pieces for subsequent proofing and baking.

2. A process as claimed in claim 1 in which the wheat flour is combined with 3.5 to 9.0 percent sugar, 2 to 2.5 percent salt, 2 to 6% skim milk solids, 3.0 percent yeast, 2 to 10 percent shortening and 65 to 70 percent water, all based on flour weight.

3. A process as claimed in claim 1 in which the wheat flour contains 50 to 100 p.p.m. ascorbic acid and 25 to 50 p.p.m. potassium bromate.

* * * * *